Figure 2B:
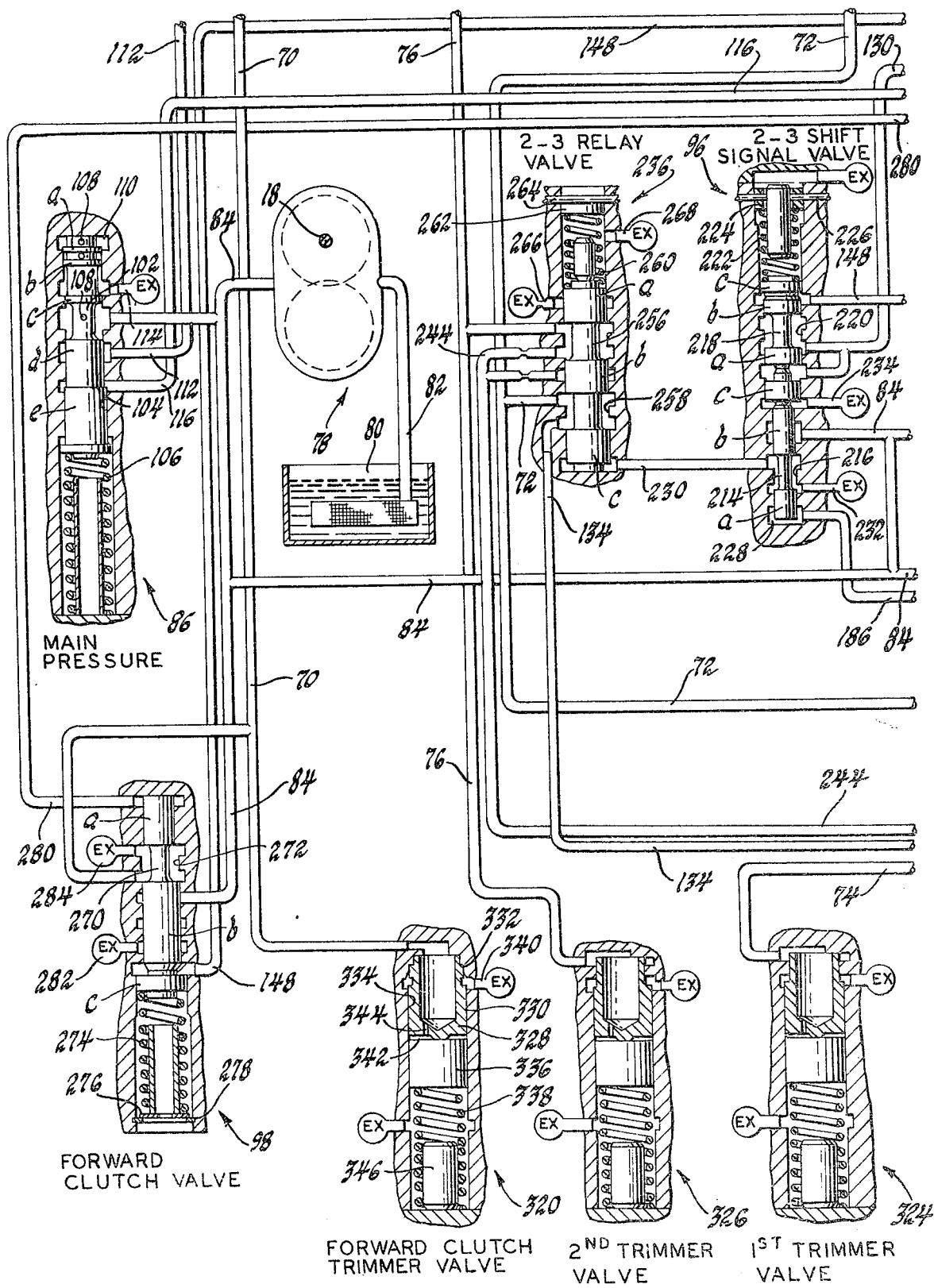

United States Patent [19]

Lentz

[11] 3,886,820
[45] June 3, 1975

[54] TRANSMISSION AND CONTROL

[75] Inventor: Carl A. Lentz, Mooresville, Ind.

[73] Assignee: General Motors Corporation, Detroit, Mich.

[22] Filed: Nov. 28, 1973

[21] Appl. No.: 419,696

Related U.S. Application Data

[63] Continuation-in-part of Ser. No. 383,767, July 30, 1973, abandoned.

[52] U.S. Cl. ..................... 74/869; 74/868; 74/867; 74/752 C
[51] Int. Cl. .......................... B60k 21/02; F16h 3/74
[58] Field of Search .......... 74/867, 868, 869, 752 C

[56] References Cited
UNITED STATES PATENTS

| | | |
|---|---|---|
| 3,049,937 | 8/1962 | Lindsay ................................ 74/869 |
| 3,117,464 | 1/1964 | Ivey ..................................... 74/869 |
| 3,640,157 | 2/1972 | Schaefer ....................... 74/752 C X |
| 3,713,354 | 1/1973 | Edmunds .......................... 74/869 X |

*Primary Examiner*—Samuel Scott
*Assistant Examiner*—P. S. Lall
*Attorney, Agent, or Firm*—Donald F. Scherer

[57] ABSTRACT

A control for a multi-speed transmission adapted to be driven by a two spool gas turbine engine. The control has valving to control the shifting of ratios within the transmission including an engagement control valve responsive to compressor discharge pressure and vehicle speed. The engagement control valve permits the operator to control the engagement of a drive establishing device, for both low forward drive and reverse drive, at predetermined engine power conditions as represented by compressor discharge pressure.

3 Claims, 4 Drawing Figures

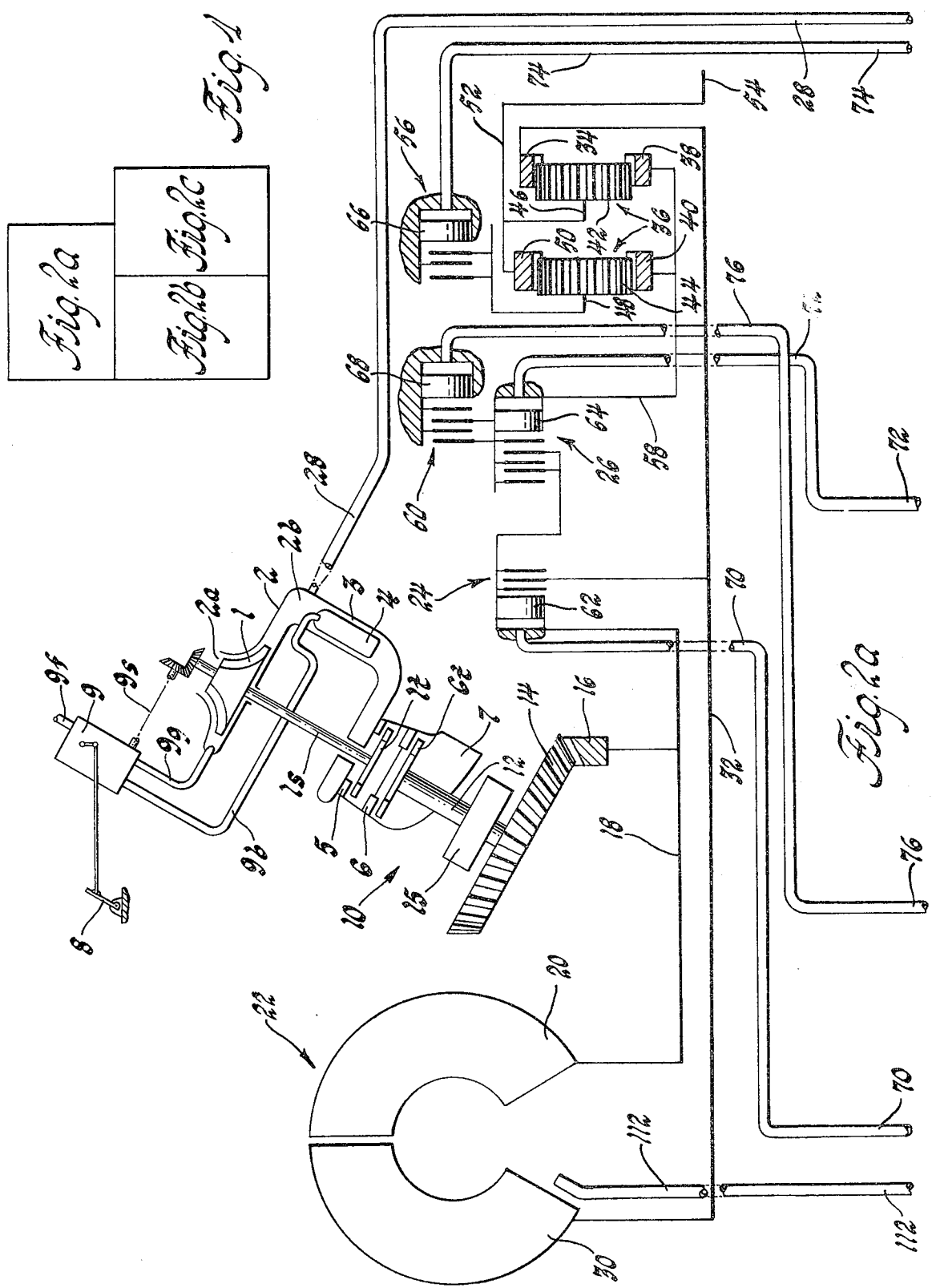

TRANSMISSION AND CONTROL

This is a continuation-in-part of Ser. No. 383,767, filed July 30, 1973, now abandoned, in the United States.

This invention relates to transmissions and controls and more particularly to transmission controls wherein the operator has control the drive engagement in forward and reverse drives.

The present invention, in its preferred embodiment, is used to control an automatic shifting planetary transmission which is driven by a two spool type gas turbine engine. With a two spool type gas turbine engine it is possible to stall the power turbine while permitting the compressor turbine and compressor to continue rotating. With the power turbine stalled, maximum engine torque is delivered from the engine. Since the power turbine can be stalled, it is possible to provide mechanical drive connection between the engine and transmission, thus bypassing the more conventional fluid drive, such as the fluid coupling or torque converter, normally interposed between the engine and the transmission. When a direct mechanical drive is provided, it is desirable to prevent the mechanical connection, such as a clutch or brake, from being engaged when the vehicle is stopped or moving at very low speed and when the engine power is above a predetermined level. It is also desirable to permit the operator to have control over the engagement of the friction drive establishing device which is to be engaged in either the low forward drive ratio or the reverse drive ratio.

In the preferred embodiment, the engine is coupled to the transmission such that a direct mechanical drive is provided in the reverse drive ratio and a fluid coupling is interposed between the engine and the transmission in the low forward ratio. A control system is utilized to control the engagement of the friction drive establishing devices of the transmission; which devices are arranged such that one of them is engaged to provide reaction in a planetary gear set in both the low forward drive ratio and the reverse drive ratio. A control valve is included in the system which responds to vehicle speed and engine power to control the engagement of the one friction drive establishing device. The control valve is arranged such that when the vehicle is stationary and the engine is at idle, the low ratio drive establishing device is disengaged through the control valve when a forward drive is requested by the operator. The control valve moves in response to engine power, which is controlled by the operator through the operation of engine throttle, to permit the low forward drive ratio establishing device to be engaged at a rate which is influenced by the throttle position. After the throttle has been advanced sufficiently such that the engine is above a predetermined power level, the drive establishing device will be fully engaged. This permits the operator to engage the friction device slowly when rapid acceleration of the vehicle is not desired, and also permits rapid engagement when high starting torque and therefore high engine power is required.

In the reverse drive ratio, a mechanical input drive is provided through the engagement of a friction clutch and the same friction drive establishing device is utilized to provide reaction in the planetary gear set. Thus, the same control valve is utilized to control engagement of the reaction device. If the vehicle is moving forward and the operator requests a directional change by shifting the manual selector to reverse, governor pressure acting on the control valve maintains the control valve in a position such that the reaction device is disengaged. Thus, a forward-reverse drive change, in the transmission, cannot be accomplished when the vehicle is moving forward above a predetermined speed. The control valve, as discussed above, is also responsive to engine power, such that, when the engine power is above a predetermined level and a reverse drive is requested, the reaction device remains disengaged. When the operator permits the engine to return to idle condition, by releasing the throttle, the control valve will be moved by throttle pressure to permit engagement of the reaction device.

It is an object of this invention to provide in an improved gas turbine engine driven transmission, a transmission control wherein the compressor discharge pressure of the engine controls valving in the transmission control to permit the operator to control the engagement of a friction drive establishing device in the transmission in both a low forward drive and a reverse drive.

It is also an object of this invention to provide in an improved control for engine driven transmission a control valve which is controlled by the operator to permit engagement of a friction drive establishing device in the transmission and both a forward and reverse drive direction.

Another object of this invention is to provide in an improved control for an engine driven transmission a control valve which responds to engine power and vehicle speed to permit the operator to control the engagement of a reaction device in the transmission during one direction of vehicle travel and for preventing engagement of the reaction device in the opposite direction of vehicle drive when the vehicle speed is above a predetermined level.

Another object of this invention is to provide in an improved control for an engine driven transmission a control valve which is responsive to engine power and vehicle speed to control the engagement of a reaction device in both the low forward drive ratio and the reverse drive ratio such that the reaction device is not engaged, in the forward drive, when the engine power is below a predetermined level and, in the reverse drive, when the engine power is above a predetermined level.

Figure 2C:
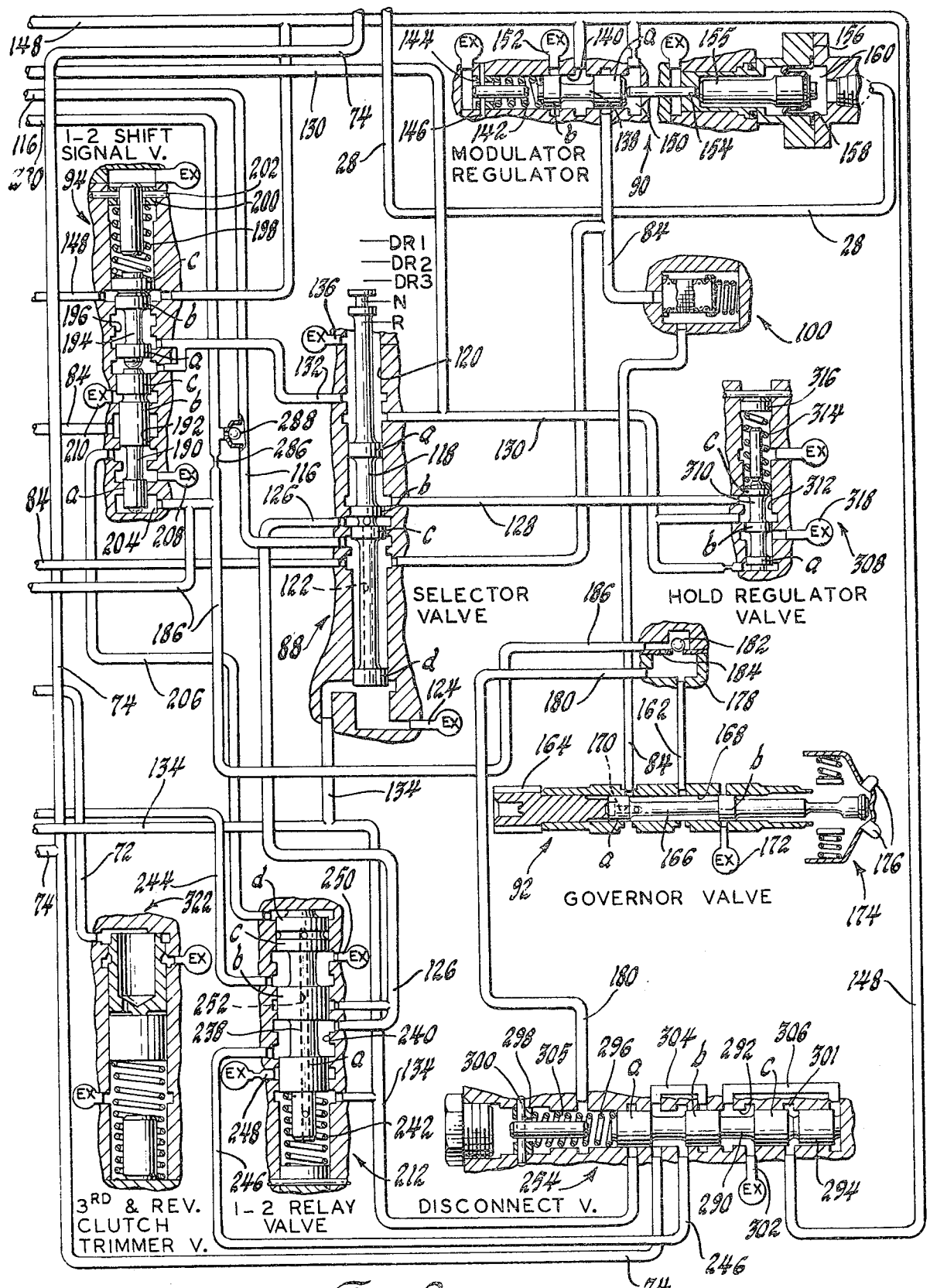

These and other objects and advantages of the present invention will be more apparent from the following description and drawings in which:

FIG. 1 is a block diagram showing the arrangement of FIGS. 2a, 2b, and 2c;

FIGS. 2a, 2b, and 2c are diagrammatic representations of the preferred embodiment of the transmission and control.

Referring to the drawings there is shown a gas turbine engine 10 having an air compressor 1 located in a compressor housing 2 having an inlet 2a and an outlet 2b. The compressor 1 is connected by shaft $1s$ to the compressor turbine $1t$. The compressor 1 delivers air under pressure through the compressor outlet 2b to the duct 3 in which the fuel burner 4 is located. The duct 3 delivers the high temperature gas through the nozzle 5 to drive the compressor turbine $1t$. The gas then passes through nozzles 6 to drive the power turbine $6t$ which drives an output shaft 12. The exhaust gases being conducted at atmosphere or to a suitable heat regenerative system by the exhaust duct 7.

The throttle pedal 8 is connected to a fuel control mechanism 9 which is subject to gasifier discharge pressure via line 9g and compressor speed via shaft 9s to connect the fuel supply line 9f to the fuel burner supply pipe 9b to control the supply of fuel to the burner 4. Various conventional fuel control systems may be employed controlling the amount of fuel supplied to the burner in response to the throttle pedal position in accordance with gasifier outlet or discharge pressure and compressor speed and/or the temperature of gases supplied to the turbine in order to prevent overheating. The output shaft 12 is drivingly connected to a bevel gear 14 through a suitable reduction gear unit 15. The bevel gear 14 meshes with another bevel gear 16 which is drivingly connected to a transmission input shaft 18. The transmission input shaft 18 is drivingly connected to an impeller 20 of a fluid coupling, generally designated 22, forward clutch 24 and a direct-reverse clutch 26. The compressor outlet 2b is also connected to a fluid passage 28 to provide fluid communication between the compressor discharge pressure of the gas turbine engine 10 and the transmission control as explained below.

The fluid coupling 22 also has a turbine 30 which is drivingly connected to a turbine output shaft 32 which in turn is connected to the forward clutch 24 and a ring gear 34 of a planetary gear arrangement 36. The planetary gearing arrangement 36 also includes a pair of interconnected sun gears 38 and 40 which mesh with planetary pinions 42 and 44 respectively. The planet pinions 42 are rotatably mounted on a planet carrier 46 and mesh with the ring gear 34 and the planet pinions 44 are rotatably mounted on a planet carrier 48 and mesh with a ring gear 50. The ring gear 50 and carrier 46 are drivingly connected through a hub 52 to a transmission output shaft 54. The carrier 48 is drivingly connected to a selectively operable fluid brake 56. The sun gears 38 and 40 are drivingly connected, through a hub 58, with the direct-reverse clutch 26 and a selectively operable fluid brake 60. The clutches and brakes 24, 26, 56, and 60 are fluid operated devices which are selectively engageable by fluid operated pistons 62, 64, 66, and 68 respectively. The fluid operated piston 62 is controlled by fluid pressure in a forward clutch engage passage 70. The fluid operated piston 64 is controlled by fluid pressure in a direct-reverse engage passage 72. The fluid operated pistons 66 and 68 are controlled by fluid pressure in a low-reverse engage passage 74 and an intermediate engage passage 76 respectively.

The planetary gearing arrangement 36 is selectively operable to provide three forward drive ratios and a reverse drive ratio. A low forward drive ratio is provided when the brake 56 is engaged. The transmission input in the low forward drive ratio maybe either a mechanical input or a fluid drive input depending upon whether clutch 24 is engaged or disengaged. It is preferable to initially provide a fluid drive input to the planetary gearing 36, during low gear operation and the control system has been designed in accordance with this preference. A second or intermediate forward drive ratio is established in the planetary gearing 36 when the brake 60 is engaged and the brake 56 is disengaged, again in this drive ratio the clutch 24 may be either engaged or disengaged. It is preferable, however, that the clutch 24 be engaged. A high or third forward drive ratio is established in the planetary gearing arrangement 36, when the clutch 26 is engaged. Depending on the operating condition of clutch 24 the high forward drive ratio may be either a split fluid mechanical drive, however, a direct mechanical drive is preferred. A reverse drive ratio is established in the planetary arrangement 36 when the brake 56 and the clutch 26 are engaged and a brake 60 and clutch 24 are disengaged. The reverse drive ratio is a mechanical drive between the engine 10 and the output shaft 54. In the reverse drive ratio the ring gear 34 and therefore the turbine 30 are rotated in the reverse direction. Thus, no fluid drive input is available to the transmission. It has been found that reverse rotation of the turbine does not substantially reduce the transmission efficiency, however, if the transmission efficiency is found to be impaired, the fluid coupling 22 can be constructed in accordance with the conventional dump and fill type couplings such that no fluid would be available in the coupling during the reverse drive.

The clutches and brakes described above are controlled by a fluid control system shown in FIGS. 2b and 2c. The control system includes a conventional fluid pump 78 which is driven by the shaft 18 and draws fluids from a reservoir 80 through a passage 82 which fluid is delivered through a main passage 84. The main passage 84 is connected to a main pressure regulator 86, a manual selector valve 88, a modulator regulator 90, a governor valve 92, a one-two shift signal valve 94, a two-three shift signal valve 96, and a forward clutch valve 98. A filter 100 is disposed in the main passage 84 between the pump 78 and the governor valve 92 to prevent contamination from interfering with the operation of the governor valve 92.

MAIN PRESSURE REGULATOR

The main pressure regulator valve 86 has a valve spool 102 with spaced equal diameter lands $a$, $b$, $c$, and $d$, and a larger diameter land $e$, which lands are slidably disposed in a step valve bore 104. The valve spool 102 is urged upwardly, as shown in FIG. 2b, in the valve bore 104 by a compression spring 106 such that the main passage 84 is connected between valve lands $c$ and $d$. Fluid pressure in main passage 84 is directed through an internal passage 108 to a chamber 110 adjacent land $a$ of the valve spool 102. Fluid pressure in chamber 110 causes the valve spool 102 to move against the spring 106 until valve land $d$ opens fluid communication between main passage 84 and a coupling feed passage 112. This passage 112 provides fluid pressure for the operation of the coupling 22. Further movement of the valve spool 102 permits valve land $c$ to open fluid communication between land passage 84 and an exhaust passage 114 thereby limiting the pressure in the main passage 84. A neutral-forward knockdown passage 116 is in fluid communication with the differential area between lands $d$ and $e$ to further reduce main line pressure during neutral and forward operation. The passage 116 is also connected to the manual selector valve 88.

MANUAL SELECTOR VALVE

The manual selector valve 88 includes a valve spool 118 having equal diameter spaced lands $a$, $b$, $c$, and $d$ which are slidably disposed in a valve bore 120. The valve spool 118 is selectively moveable, by the operator, to a neutral N, reverse R, forward drive DR3, forward drive DR2, and forward drive DR1 positions. An internal passage 122 provides fluid communication between the area intermediate lands $b$, and $c$ with an exhaust passage 124 which is connected to the valve bore 120. Also connected to the valve bore 120 is the neutral-forward knockdown passage 116, a forward drive passage 126, a hold feed passage 128, a DR2 hold passage 130, a DR1 hold passage 132, a reverse passage 134, and an exhaust 136. In the neutral position shown, the main passage 84 is connected between lands $c$ and $d$ with the neutral forward knockdown passage 116 so that fluid pressure is provided to the main pressure regulator 86 to reduce main line pressure. In the neutral condition shown, the remaining passages are connected to exhaust.

When the valve spool 118 is moved to the R position fluid communication is provided between lands $c$ and $d$ to connect the main line passage 84 and the reverse passage 134. In the R position the forward knockdown passage 116 is exhausted via the internal passage 122 and the remaining passages are also exhausted. In the DR3 position fluid pressure in main passage 84 is directed via the area intermediate lands $c$ and $d$ to the neutral-forward knockdown passage 116 and the forward passage 126. The hold feed passage 128 is exhausted via the internal passage 122 and the remaining passages are also exhausted. In the DR2 position, main pressure in passage 84 is connected via the area between lands $c$ and $d$ with the neutral-forward knockdown passage 116, the forward passage 126, and the hold feed passage 128. The DR2 hold passage 130 is closed to exhaust 136 by valve land $a$ and the reverse passage 134 and DR1 hold passage 132 are exhausted. In the DR1 position, the area between lands $c$ and $d$ connects the main passage 84 with the neutral-forward knockdown passage 116 the forward passage 126, and the hold feed passage 128. The DR2 hold passage 130 and the DR1 hold passage 132 are connected between lands $a$ and $b$ and are closed from the exhaust passage 136 by valve land $a$. The reverse passage 134 is connected with exhaust 124.

MODULATOR REGULATOR

The modulator regulator valve 90 includes a valve spool 138 having spaced equal diameter lands a and b slidably disposed in a valve bore 140. A compression spring 142 is compressed between valve land $b$ and a ring 144 secured in a valve bore 140 by a pin 146. The spring 142 urges the valve spool 138 to the right, as seen in FIG. 2c, to provide fluid communication between main passage 84 and a throttle pressure passage 148. The throttle pressure passage 148 is in fluid communication with a chamber 150 formed between the end of valve bore 140 and valve land $a$. As pressure develops in chamber 150, the valve spool 138 is moved to the left against spring 142 to provide fluid communication between passage 148 and an exhaust passage 152, thereby limiting further increases in fluid pressure in passage 148. A pin 154 is in abutting relationship between valve land $a$ and a compressor discharge pressure signal plug 155. The plug 155 is mounted in a housing 156 with a flexible diaphragm 158 such that a chamber 160 is formed adjacent one end of the plug 155. The chamber 160 is in fluid communication with the compressor discharge passage 28 and is subjected to the discharge pressure of the compressor. The force due to compressor discharge pressure acting on plug 155 is transmitted to valve spool 138 through the pin 154. This force also counteracts the force in spring 142 such that, as compressor discharge pressure increases in chamber 150, throttle pressure in passage 148 is decreased. It is well known that compressor discharge pressure is proportional to the power level in a gas turbine engine. Since the pressure in passage 148 decreases as compressor discharge pressure increases, throttle pressure inversely proportional to engine power is provided in passage 148.

GOVERNOR VALVE

The governor valve 92 is constructed in accordance with the teaching in U.S. Pat. No. 2,762,348 issued to Rosenberger, Sept. 11, 1956. The Rosenberger patent may be referred to for a more complete description of the operation of the governor valve 92. The governor 92 is a fly weight type governor, the operation of which is well known in the art. As is known the governor valve 92 is supplied with fluid pressure such as from main passage 84 and delivers fluid passage through a governor passage 162. The fluid pressure in governor passage 162 is proportional to the governor input speed which in the present control is proportional to transmission output speed since the governor valve 92 is adapted to be driven through a gear 164 by the output shaft 54. The governor valve 92 has a valve spool 166 which has equal diameter spaced lands a and b slidably disposed in a valve bore 168. An internal passage 170 directs fluid pressure from between lands $a$ and $b$ to a chamber 170 adjacent the left end of the valve spool 166. Fluid pressure in chamber 170 urges the valve spool 166 to the right such that theh area between lands $a$ and $b$ can be connected to an exhaust passage 172. Movement of the valve spool 166 to the right is counteracted by the fly weights 174 which move radially outwardly in response to rotation of the gear 164 and imposes a force on the end of the valve spool 166 through lever arms 176. Thus, the fluid pressure in chamber 170 is counteracted by the force of fly weights 174 acting on the spool 166 such that the fluid pressure between lands $a$ and $b$, and therefore in governor passage 162, is maintained proportional to the rotary speed of the governor 92. The governor passage 162 is in fluid communication with a distribution housing 178 which provides direct communication between governor passage 172 and a governor inhibit passage 180. A ball check valve 182 and a fluid restriction 184 provide controlled fluid communication between the governor passage 162 and a governor shift passage 186. As long as governor pressure in governor passage 162 is constant or increasing, the ball check valve 182 provides unrestricted communication between passages 162 and 186. However, if the pressure in governor passage 162 should decrease, such as can result from rapid deceleration of output shaft 54, an equally rapid decrease in governor shift passage 186 is prevented because the ball check valve 182 closes and fluid flow from passage 186 to passage 162 is restricted by the fluid restriction 184.

1-2 SHIFT SIGNAL VALVE

The 1-2 shift signal valve 94 includes a first valve spool 190 having lands $a$, $b$, and $c$ of increasing diameter from $a$ to $c$ slidably disposed in a step valve bore 192 and a second valve spool 194 having equal diameter lands $a$ and $b$ and a larger diameter land $c$ slidably disposed in a stepped valve bore 196. A compression spring 198 is compressed between valve land c of spool 194 and a ring 200 which is positioned in the valve bore 196 by a pin 202. The compression spring 198 urges the valve spools 190 and 194 downward in their respective valve bores, as seen in FIG. 2c. A governor chamber 204 is formed between valve land a of spool 190 and the lower end of valve bore 192 which chamber 204 is in fluid communication with the governor shift passage 186. The valve bore 192 is also in fluid communication with a 1-2 signal passage 206 intermediate lands a and b of valve spool 190, the main passage 84 adjacent land b, and two exhaust passages 208 and 210. The 1-2 signal passage 206 is also connected to a 1-2 relay valve 212. The DR1 passage 132 is in fluid communication intermediate land c of spool 190 and land a of spool 194 and also with valve bore 196 intermediate lands a and b. The throttle pressure passage 148 is in fluid communication with the valve bore 196 in such manner as to permit throttle pressure in passage 148 to act on the differential area between lands b and c of valve spool 194.

In the position shown, the 1-2 shift signal valve is in the low or first drive ratio position. In this position the pressure in main passage 84 is blocked by valve land b of spool 190 and the 1-2 shift signal passage 206 is exhausted through passage 208 intermediate lands a and b. However, when the combination of governor pressure in passage 186 and throttle pressure in passage 148 acting on the valve spool 190 and 194 are sufficient to overcome the force in spring 198, the valve spool 190 will move upward to the upshifted position, thereby disconnecting passage 206 from exhaust passage 208 and at the same time connecting passage 206 to main passage 84. If the manual selector valve 88 is positioned in the DR1 position, hold regulator pressure will be present in passage 132 which will cause separation of the valve spools 194 and 190, thereby preventing upshifting of the valve spool 190 in response to the governor pressure in chamber 204 unless the transmission output shaft should experience very high speeds.

2-3 SHIFT SIGNAL VALVE

The 2-3 shift signal valve 96 includes a first valve spool 214 having lands a, b, and c, increasing in diameter from a to c, slidably disposed in a stepped valve bore 216, and a second valve spool 218 having spaced equal diameter lands a and b and a larger diameter land c slidably disposed in a stepped valve bore 220. A compression spring 222 is compressed between valve land c of spool 218 and a ring 224 secured in valve bore 220 by a pin 226. The compression spring 222 urges the valve spools 218 and 214 downward in there respective bores to the downshifted position shown in FIG. 2b. A governor control chamber 228 is formed between valve land a of spool 214 and one end of valve bore 216, which chamber 228 is in fluid communication with the governor shift passage 186. The valve bore 216 is in fluid communication with the main pressure passage 84, a 2-3 signal passage 230, and two exhaust passages 232 and 234. The DR2 hold passage 130 is in fluid communication with the area between land c of spool 214 and land a of spool 218 and also with the area intermediate lands a and b of valve spool 218. The throttle pressure passage 148 is in fluid communication with the valve bore 220 so as to provide throttle pressure on the differential area between lands b and c of spool 218. The 2-3 signal passage 230 is also in fluid communication with a 2-3 relay valve 236.

The valve spools 214 and 218 are shown in the downshifted position which is the second or intermediate forward drive ratio position. These valve spools respond to pressure in passages 186 and 148 to provide an upshift from second to third in a well known manner. In the intermediate drive ratio position shown, the 2-3 signal passage 230 is exhausted intermediate lands a and b of valve spool 214 while the main passage 84 is blocked by land b of valve spool 214. When the 2-3 shift signal valve is upshifted, by governor and throttle pressure, to the third ratio position, the 2-3 signal passage 230 is disconnected from exhaust 232 and is simultaneously connected to the main passage 84. When the manual selector valve 88 is moved to the DR2 position, hold regulator pressure in passage 130 is provided between the valve spools 218 and 214 to cause separation thereof to prevent the normal upshifting of the valve spool 214. The valve spool 214 will upshift if the transmission output speed should become excessive.

1-2 RELAY VALVE

The 1-2 relay valve 212 includes a valve spool 238 having spaced equal diameter lands a, b, c, and d, which are slidably disposed in a valve bore 240, which valve spool 238 is urged upwardly in valve bore 240, to the downshifted position shown, by a compression spring 242. The valve bore 240 is in fluid communication with the reverse passage 134, the 1-2 signal passage 206, a 2-3 engage passage 244, the forward passage 126, a low engage passage 246, and two exhaust passages 248 and 250. An internal passage 252 provides fluid communication between the end of valve spool adjacent land a and the area intermediate valve lands c and d. The low engage passage 246 is connected to a disconnect valve or engagement control, 254, and the 2-3 engage passage 244 is connected to the 2-3 relay valve 236.

In the position shown, the 1-2 relay valve 212 provides fluid communication between forward passage 126 and the low engage passage 246 while the 2-3 engage passage 244 is exhausted through passage 250. When a 1-2 upshift signal is received by the 1-2 relay valve 212 from the 1-2 signal passage 206, the valve spool 238 moves downward in valve bore 240 thereby disconnecting the low engage passage 246 from the forward passage 126 while simultaneously connecting the 2-3 engage passage 244 to the forward passage 126. In the upshifted position, the area adjacent spring 242 is exhausted through the internal passage 252 via exhaust 250 and the passage 246 is exhausted intermediate lands a and b via passage 248.

2-3 RELAY VALVE

The 2-3 relay valve 236 includes a valve spool 256 having equal diameter spaced lands a, b, and c slidably disposed in a valve bore 258. A compression spring 260 is compressed between valve land a and a ring 262 which is secured in valve bore 258 by a pin 264. The valve bore 258 is in fluid communication with the 2-3 signal passage 230, the reverse passage 134, the 2-3 engage passage 244, the direct-reverse engage passage 72, and two exhaust passages 266 and 268.

In the downshifted position shown, the 2-3 relay valve provides fluid communication between passage 134 and passage 72 which permits exhaust of passage 72 at the manual selector valve 88. The passage 244 is in fluid communication with passage 76 which permits exhausting of passage 76 when the 1–2 relay valve 212 is in the low position and permits pressurization of passage 76 when the 1–2 relay valve 212 is in the upshifted position. When the 2–3 shift valve 96 is upshifted, fluid pressure from passage 84 is communicated to the 2–3 signal passage 230 to cause the valve spool 256 to move to the upshifted position against the force in spring 260. In the upshifted position of the 2–3 relay valve 236, passage 76 is exhausted to passage 266 and passage 72 is pressurized from passage 244 between lands $c$ and $b$.

FORWARD CLUTCH VALVE

The forward clutch valve 98 includes a valve spool 270 having spaced lands $a$, $b$, and $c$, increasing in diameter from $a$ to $c$ which are slidably disposed in a stepped valve bore 272. A compression spring 274 is compressed between valve land $c$ and a retaining member 276 which is secured in valve bore 272 by a retaining ring 278. The valve bore 272 is in fluid communication with the forward clutch engage passage 70, the main passagae 84, the throttle pressure passage 148, a governor feed passage 280, and two exhaust passages 282 and 284. The governor feed passage 280 is connected with the governor feed passage 186 through a restriction 286 and with the neutral-forward knockdown passage 116 through a one-way ball check 288.

In the position shown, which is the forward clutch downshifted or disengaged position, the forward clutch valve 98 exhausts the forward clutch engage passage 70 between lands $a$ and $b$. When the manual selector valve 88 is in the reverse position, the governor feed passage 280 is exhausted through ball check valve 288, passage 116, and the internal passage 122 in the manual selector valve 88. In this condition, governor feed pressure in passage 186 is reduced through restriction 286 so that governor pressure cannot act on valve land $a$ of spool 270 to cause upshifting of the forward clutch valve 98. When the manual selector valve 88 is in the forward drive position, the ball check valve 288 is closed by fluid pressure in passage 116 so that governor pressure is available in passage 280 to cooperate with throttle pressure in passage 148 to act on valve spool 270 to cause upshifting of the forward clutch valve 98 at predetermined and programmed pressures in passages 280 and 148. When the forward clutch valve 98 is upshifted, fluid pressure in passage 84 is communicated between lands $a$ and $b$ to the forward clutch engage passage 70 such that the forward clutch 24 will be engaged.

DISCONNECT VALVE

The disconnect valve 254 includes a valve spool 290 having spaced equal diameter lands $a$, $b$, and $c$ which are slidably disposed in a valve bore 292, and a valve plug 294 which is also slidably disposed in valve bore 292. A compression spring 296 is compressed between valve land $a$ and a retaining ring 298 which is secured in valve bore 292 via a pin 300. In the position shown, the spring 296 urges the valve spool 290 and valve plug 294 to the right. The valve bore 292 is in fluid communication with the low-reverse engage passage between lands $a$ and $b$, the low engage passage 246 between lands $a$ and $b$, reverse passage 134 adjacent land $a$, throttle pressure passage 148 and at control chamber 301 intermediate valve land $c$ and valve plug 294, an exhaust passage 302 intermediate lands $b$ and $c$, a cross over passage 304 connected intermediate lands $a$ and $b$ and adjacent land $b$, a reverse hold passage 306 intermediate lands $b$ and $c$ and adjacent the end of valve plug 294 and the governor inhibit passage 180 at a control chambere 305 formed by valve land $a$ and one end of bore 292. In the position shown, passage 246 is in fluid communication with passage 74 between lands $a$ and $b$. In this position, fluid pressure is available to engage brake 56 when the 1–2 relay valve 212 is in the downshifted position. This will occur when the manual selector valve is in one of the forward drive positions and the throttle pressure in passage 148 is sufficiently low. If the engine is at the idle speed, throttle pressure in passage 148 will cause the valve spool 290 to move to the left against spring 296 such that the low-reverse engage passage 74 is exhausted between lands $a$ and $b$ through passage 134 and the manual selector valve 88. As the operator increases engine throttle, and therefore engine power, fluid pressure in passage 148 will decrease such that valve spring 296 will move the valve spool 290 to the right thereby providing controlled communication between passages 74 and 246 such that the operator can control engagement of the brake 56 through movement of the engine throttle. If rapid engagement of the brake 56 is required, the operator can also control the engagement through rapid movement of the engine throttle which will cause a rapid increase in engine power to quickly reduce the fluid pressure in passage 148.

If the manual selector valve 88 is moved to the reverse position and fluid pressure in the governor inhibit passage 180 is zero and the engine is at idle, resulting in maximum throttle pressure in passage 148, the valve spool 290 will be moved to the left thereby providing fluid communication between the reverse passage 134 and the low-reverse engage passage 74. When the valve spool 290 is moved to the left for reverse drive, fluid pressure is also directed via passage 304 and 306 to the right end of valve plug 294 which will maintain the valve spool 290 in the leftward position even through governor inhibit pressure in passage 180 will increase with vehicle speed. However, if the manual selector valve 88 is shifted from the forward to the reverse position, when the vehicle is moving, governor inhibit pressure in passage 180 and control chamber 305 will maintain the valve spool 290 in the rightward position shown, thereby preventing a forward-reverse shift until the vehicle speed is substantially zero.

HOLD REGULATOR VALVE

The hold feed passage 128 and the DR2 hold passage 130 are in fluid communication with a hold regulator valve 308. The hold regulator valve 308 includes a valve spool 310 having equal diameter spaced lands $a$, $b$, and $c$ which are slidably disposed in a valve bore 312 which is in fluid communication with the hold feed passage 128 intermediate lands $c$ and $b$ and with the DR2 hold passage 130 intermediate lands $c$ and $b$ and adjacent the end of land $a$. The valve spool 310 is urged toward the position shown by a compression spring 314 which is compressed between valve land $c$ and a plug 316. The hold regulator valve 308 is basically a pressure reducing valve which accepts main line fluid pressure from hold feed passage 128 and delivers fluid pressure via the DR2 hold passage 130 at a reduced pressure. Fluid pressure in passage 130 urges the valve spool 310 upward in valve bore 312 such that at a predetermined pressure in passage 310 the valve spool 310 discontinues fluid communication between passages 128 and 130 while providing limited communication between passage 130 and an exhaust passage 318. Thus the pressure is reduced between passage 128 and 130. As described above, fluid pressure in passage 130 is communicated to the 2–3 shift signal valve 96 to prevent the normal upshifting characteristic of the valve, and fluid pressure is also directed from passage 130 to passage 132; which passage 132 is in fluid communication with the 1–2 shift signal valve 194 to prevent the normal upshifting characteristic of that valve

TRIMMER VALVE

The engagement passages 70, 72, 74, and 76 are in fluid communication with a forward clutch trimmer valve 320, a third and reverse clutch trimmer valve 322, a first trimmer valve 324 and a second trimmer valve 326 respectively. These trimmer valves act in a well known manner to provide a controlled pressure rise in the clutches and brakes of the transmission, such that controlled engagement thereof is obtained. Trimmer valve 320 which controls engagement of the forward clutch 24, includes a valve 328 which has a large diameter portion 330 and a smaller diameter portion 332 slidably disposed in a stepped valve bore 334. A valve plug 336 is also slidably disposed in valve bore 334 which valve plug 336 is urged into abutting relationship with valve 328 by a compression spring 338. The valve bore 334 is in fluid communication with the forward clutch engage passage 70 adjacent the smaller land 332 and with an exhaust passage 340 intermediate portions 330 and 332. Fluid pressure in passage 70 is communicated to a space 342 intermediate valve 328 and plug 336 via a restrictive passage 344. When fluid pressure is supplied to passage 70, the pressure acts on valve 328 to move the valve 328 to provide limited communication between passage 70 and exhaust passage 340, the pressure in passage 70 is therefore regulated at a low pressure determined by the force in spring 338. The fluid pressure in passage 70 is communicated through the restriction 344 to the space 342 between valve 328 and plug 336 to cause compression of a spring 338 thereby increasing the force tending to close the valve 328. The pressure in passage 70 continues to rise as the spring 338 is compressed until the plug 336 comes to rest against a stop member 346. When the plug abuts the stop member 346, the pressure in passage 70 will quickly rise to a value equal to main pressure in passage 84.

The trimmer valves 322, 324 and 326 are constructed in a manner the same as that described above for trimmer valve 320 and operate in a manner identical thereto. Therefore further description thereof is not necessary. The operation of the first trimmer valve 324 is also influenced by the disconnected valve 254. When the disconnect valve 254 is utilized to control the engagement of brake 56, the pressure rise in brake 56 is controlled by the disconnect valve 254 rather than by the trimmer valve 324.

OPERATION

The control valves described above operate to control the engagement and disengagement of the clutches and brakes for the transmission shown in FIG. 2a. For reverse operation, the manual selector valve 88 is moved to the reverse position such that fluid pressure is delivered to the disconnect valve 254 via passage 134. As described above, if the engine is at idle and the vehicle speed is zero, fluid pressure will be directed through the disconnect valve 254 to the low-reverse engage passage 74 which will cause engagement of the brake 56. The rate of pressure in brake 56 is controlled by the first trimmer valve 324. If the vehicle is moving when the manual selector valve 88 is moved to the reverse position, fluid pressure is blocked by the disconnect valve 254 to prevent engagement of the brake 56 until the vehicle speed is substantially zero, at which time the brake 56 will be engaged. The disconnect valve 254 will also prevent engagement of the brake 56 when the manual selector valve is moved to the reverse position if the engine power is above a predetermined value as represented by the pressure in passage 148. At this time, the engagement of brake 56 can be controlled by the operator through manipulation of the engine throttle, in a power decreasing direction, to provide controlled feed to passage 74 through the disconnect valve 254.

If the manual selector valve is moved to the DR3 position fluid pressure is directed via passage 126 to the disconnect valve 254 through the 1–2 relay valve 212. As discussed above, the engagement of brake 56 is controlled by the operator through manipulation of the vehicle throttle. When the brake 56 is engaged and the vehicle begins to move forward, governor pressure in passage 162 will increase thereby transmitting upshifting pressures to the 1–2 shift signal valve 94 and the 2–3 shift signal 96 via governor shift passage 186 and to the forward clutch valve 98 via passage 280. When the governor pressure and throttle pressure acting on the forward clutch valve 98 are sufficient to provide upshifting of the forward clutch valve 98, the forward clutch 24 is engaged to provide a direct mechanical drive between the engine 10 and the planetary gearing arrangement 36. The 1–2 shift signal valve 94 will also be upshifted by governor pressure and throttle pressure at programmed predetermined vehicle speeds and throttle pressures to direct a 1–2 shift signal via passage 206 to the 1–2 relay valve 212. When the 1–2 relay valve 212 is upshifted by pressure in passage 206, the brake 56 will be exhausted through the 1–2 relay valve 212 while the intermediate brake 60 will be pressurized through the 1–2 relay valve 212 and the 2–3 relay valve 236. The pressurization of brake 60 will be controlled by the second trimmer valve 326 which is in fluid communication with the intermediate engage passage 76.

Further increase in governor pressure in passage 186 and/or increase in throttle pressure in passage 148 will cause the 2–3 shift signal valve 96 to upshift. Upshifting of the 2–3 signal valve 96 will direct a 2–3 upshift signal via passage 230 to the 2–3 relay valve 236. The resulting upshifting of 2–3 relay valve 236 will cause the intermediate brake 60 to be exhausted through the 2–3 relay valve 236 while the direct-reverse clutch 26 is pressurized through the 2–3 relay valve 236.

Movement of the manual selector valve 88 to the DR2 position will result in engagement of the brake 56 in the manner described above. The 1–2 shift signal valve 94 and 1–2 relay valve 212 will also upshift in accordance with the governor and throttle pressure schedules described above. However, the 2–3 shift signal valve 96 will not be upshifted according to the normal governor and throttle pressure schedule since hold regulator pressure in passage 130 counteracts the normal upshifting schedule.

When the manual selector valve 88 is moved to the DR1 position, the low forward ratio will be engaged as described above for the DR3 and DR2 positions. However, the normal upshifting schedules of the 1–2 shift signal valve 94 and the 2–3 shift signal valve 96 will be overridden by hold regulator pressure acting in passage 132 and 130.

With the exception of the disconnect valve 254, the valving described above is very similar to the control system described in U.S. Pat. No. 3,713,354, which may be utilized to supplement the disclosure herein. The terms "up", "down", "left" and "right" used herein are merely for ease of description and are not used as limitations.

Obviously, many modifications and variations of the present invention are possible in light of the above teachings. It is, therefore, to be understood that within the scope of the appended claims the invention may be practiced otherwise than as specifically described.

What is claimed is:

1. A control for a power transmission driven by a two-spool turbine engine having a compressor and compressor drive turbine on one shaft and a power turbine on the other shaft, and a fuel burner effective to heat the compressor discharge air and deliver the same to each turbine, the engine further having a rate of fuel supply control and a compressor discharge chamber wherein the pressure increases with increased compressor shaft speed and with increased air density and thereby represents turbine power comprising a plurality of selectively operable fluid operated friction drive establishing means for establishing a plurality fo forward drives and a reverse drive in said transmission and one of said drive establishing means being operated in the low forward drive and the reverse drive; fluid source means for providing fluid pressure in said control; shift valve means, including manual valve means selectively moveable to forward, neutral and reverse drive positions and being in fluid communication with said fluid source means for directing fluid pressure to said fluid operated friction drive establishing means; means responsive to the compressor discharge pressure; and engagement control valve means in fluid communication with said shift valve means and said one of said friction drive establishing means for controlling the operation of said one of said friction drive establishing means including control chamber means in fluid communication with the means responsive to compressor discharge pressure for preventing engagement of said one friction drive establishing means when either (a) the manual valve means is in the forward drive position and the compressor discharge pressure is below a predetermined value or (b) the manual valve means is moved from neutral to the reverse drive position and the compressor discharge pressure is above a predetermined value.

2. A control for a power transmission driven by a two-spool turbine engine having a compressor and compressor drive turbine on the other shaft, and a fuel burner effective to heat the compressor discharge air and deliver the same to each turbine, the engine further having a rate of fuel supply control and a compressor discharge chamber wherein the pressure increases with increased compressor shaft speed and with increased air density and thereby represents turbine power comprising a plurality of selectively operable fluid operated friction drive establishing means for establishing a plurality of forward drives and a reverse drive in said transmission and one of said drive establishing means being operated in the low forward drive and the reverse drive; fluid source means for providing fluid pressure in said control; shift valve means, including manual valve means selectively moveable to forward, neutral and reverse drive positions and being in fluid communication with said fluid source means for directing fluid pressure to said fluid operated friction drive establishing means; governor means in fluid communication with said fluid source means for establishing a governor control pressure in said contol; means responsive to compressor discharge pressure being in fluid communication with said fluid source means for providing an engine power signal in said control; and engagement control valve means in fluid communication with said shift valve means and said one of said friction drive establishing means for controlling the operation of said one of said friction drive establishing means including first control chamber means in fluid communication with the engine power signal of said compressor discharge pressure responsive means for preventing engagement of said one friction drive establishing means when either (a) the manual valve means is in the forward drive position and the engine power is below a predetermined value or (b) the manual valve means is moved to the reverse drive position and the engine power is above a predetermined value, and second control chamber means in fluid communication with said governor means for preventing a forward to reverse interchange in said transmission when the governor control pressure is above a predetermined value.

3. A control for a power transmission driven by a two-spool turbine engine having a compressor and compressor drive turbine on one shaft and a power turbine in the other shaft, and a fuel burner effective to heat the compressor discharge air and deliver the same to each turbine, the engine further having a rate of fuel supply control and a compressor discharge chamber wherein the pressure increases with increased compressor shaft speed and with increased air density and thereby represents turbine power comprising a plurality of selectively operable fluid operated friction drive establishing means for establishing a plurality of forward drives and a reverse drive in said transmission and one of said friction drive establishing means being operated in the low forward drive and the reverse drive; fluid source means for providing fluid pressure in said control; shift valve means; including manual valve means selectively moveable to forward, neutral and reverse drive positions and being in fluid communication with said fluid source means for directing fluid pressure to said fluid operated friction drive establishing means; governor means in fluid communication with said fluid source means for establishing a governor control pressure in said control; compressor discharge pressure responsive means in fluid communication with said fluid source means for providing an engine power signal in said control; and engagement control valve means in fluid communication with said shift valve means and said one of said friction drive establishing means for controlling the operation of said one of said friction drive establishing means including a valve spool, passage means interconnecting the valve spool, said shift valve means and said one friction drive establishing means, first control chamber means in fluid communication with the engine power signal of said compressor discharge pressure responsive means and operatively connected with said valve spool for controlling movement of said valve spool to control fluid pressure in said one friction drive establishing means when the manual valve means in the forward drive position and the engine power is below a predetermined value, and second control chamber means in fluid communication with said governor means and operatively connected with said valve spool for controlling fluid pressure in said one friction drive establishing means to prevent a forward to reverse interchange in said transmission when the governor control pressure is above a predetermined value.

* * * * *

UNITED STATES PATENT AND TRADEMARK OFFICE
CERTIFICATE OF CORRECTION

PATENT NO. : 3,886,820

DATED : June 3, 1975

INVENTOR(S) : Carl A. Lentz

It is certified that error appears in the above-identified patent and that said Letters Patent are hereby corrected as shown below:

Column 6, Line 32 "theh" should read --the--
Column 10, Line 6 "chambere" should read --chamber--
Column 11, Line 2 "310" first occurrence should read -- 130 --
Column 11, Line 13 "valve" should read --valve.--
Column 13, Line 34 "fo" should read --of--

Signed and Sealed this eighth Day of June 1976

[SEAL]

Attest:

RUTH C. MASON
Attesting Officer

C. MARSHALL DANN
Commissioner of Patents and Trademarks